(12) United States Patent
Morgan et al.

(10) Patent No.: US 9,512,784 B2
(45) Date of Patent: Dec. 6, 2016

(54) FREE GAS TURBINE WITH CONSTANT TEMPERATURE-CORRECTED GAS GENERATOR SPEED

(75) Inventors: Keith Morgan, Westmount (CA); François Belleville, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1361 days.

(21) Appl. No.: 12/696,341

(22) Filed: Jan. 29, 2010

(65) Prior Publication Data
US 2011/0185698 A1    Aug. 4, 2011

(51) Int. Cl.
*F02C 9/00* (2006.01)

(52) U.S. Cl.
CPC ...................... *F02C 9/00* (2013.01)

(58) Field of Classification Search
CPC .............. F02C 9/28; F02C 5/02; F02C 9/16; F02C 9/54; F02C 9/00; F01D 17/04
USPC .................. 60/773, 793, 39.13, 39.24, 39.25
See application file for complete search history.

(56) References Cited

U.S. PATENT DOCUMENTS

| | | | |
|---|---|---|---|
| 3,521,446 A | 7/1970 | Maljanian | |
| 3,621,657 A | 11/1971 | Jurisch et al. | |
| 3,678,285 A | 7/1972 | Griffith | |
| 3,764,814 A | 10/1973 | Griffith | |
| 3,952,502 A * | 4/1976 | Davis et al. | 60/39.25 |
| 4,145,875 A * | 3/1979 | Liddle et al. | 60/773 |
| 4,184,327 A * | 1/1980 | Cornett et al. | 60/240 |
| 4,197,699 A | 4/1980 | Parker et al. | |
| 4,370,560 A | 1/1983 | Faulkner et al. | |
| 4,406,117 A | 9/1983 | Rowen et al. | |
| 4,640,091 A | 2/1987 | Blizzard | |
| 4,864,816 A * | 9/1989 | Benvenuti | F01D 17/06 60/39.25 |
| 5,341,636 A | 8/1994 | Paul | |
| 5,732,546 A * | 3/1998 | Pineo et al. | 60/773 |
| 5,768,884 A | 6/1998 | Hines | |
| 6,308,512 B1 * | 10/2001 | Kopko | 60/773 |
| 6,591,613 B2 * | 7/2003 | Simunek | 60/773 |
| 6,735,955 B2 | 5/2004 | Mannarino | |
| 6,748,744 B2 | 6/2004 | Peplow et al. | |
| 6,758,044 B2 * | 7/2004 | Mannarino | 60/773 |
| 6,786,033 B2 * | 9/2004 | Simunek | 60/39.281 |
| 6,931,856 B2 * | 8/2005 | Belokon et al. | 60/772 |
| 7,162,874 B2 * | 1/2007 | Mowill | 60/773 |
| 7,513,120 B2 * | 4/2009 | Kupratis | 60/791 |

(Continued)

FOREIGN PATENT DOCUMENTS

| | | |
|---|---|---|
| DE | 2654864 | 6/1978 |
| EP | 0363301 | 4/1990 |
| EP | 0279487 | 1/1992 |
| EP | 2143908 | 1/2010 |

(Continued)

OTHER PUBLICATIONS

European Search Report for corresponding EP application No. 11250191 dated Jul. 21, 2011.

*Primary Examiner* — Phutthiwat Wongwian
*Assistant Examiner* — Jason H Duger
(74) *Attorney, Agent, or Firm* — Norton Rose Fulbright Canada

(57) ABSTRACT

A method of controlling a speed of a gas turbine engine including a gas generator spool and a power turbine spool rotating independently from one another, including controlling a rotational speed of the gas generator spool according to a fixed relationship with respect to an outside air temperature throughout a variation of output power.

14 Claims, 4 Drawing Sheets

(56) References Cited

U.S. PATENT DOCUMENTS

2006/0101826 A1* 5/2006 Martis et al. .................. 60/794
2010/0000222 A1* 1/2010 Price et al. .................... 60/773

FOREIGN PATENT DOCUMENTS

GB     1313841    4/1973
GB     2387415    10/2003

* cited by examiner

FREE GAS TURBINE WITH CONSTANT TEMPERATURE-CORRECTED GAS GENERATOR SPEED

TECHNICAL FIELD

The application relates generally to power and rotational speed control of a gas turbine engine and, more particularly, to the control of the rotational speed of the main shafts or spools in a free gas turbine engine.

BACKGROUND OF THE ART

In a conventional free gas turbine engine, the rotational speed Ng of the high pressure or gas generator spool usually varies in a fixed relationship with the engine power or thrust, as can be seen in FIG. 3. Inlet guide vanes are typically controlled to a predetermined position as a function of the Ng rotational speed. For gas turbine engine applications where the rotational speed Np of the low pressure or power turbine spool is maintained constant (e.g. turbo shafts), a controller usually maintains the Np rotational speed constant through a modulation of the fuel flow and as such reacts to any changes in Np rotational speed due to a change in the load applied to the power turbine. For gas turbine engine application where the rotational speed Np of the low pressure or power turbine spool is changing with thrust demand (e.g. turbofans), the Np rotational speed is controlled at the commanded reference speed through a modulation of fuel flow.

However, improvements are desirable.

SUMMARY

In one aspect, there is provided a method of controlling a speed of a gas turbine engine throughout a power demand variation thereon, the gas turbine engine including a high pressure spool and a low pressure spool rotating independently from one another, the method comprising maintaining a temperature-corrected value of a rotational speed of the high pressure spool at least substantially constant, the temperature-corrected value being determined based on the rotational speed of the high pressure spool and an air temperature measured outside of the gas turbine engine.

In another aspect, there is provided a method of controlling a speed of a gas turbine engine throughout a variation of output power thereof, the gas turbine engine including a gas generator spool and a power turbine spool rotating independently from one another, the method comprising controlling a rotational speed of the gas generator spool according to a fixed relationship with respect to an outside air temperature throughout the variation of output power.

In a further aspect, there is provided a gas turbine engine comprising a low pressure spool supporting at least one rotor of a low pressure turbine, a high pressure spool supporting at least one rotor of a high pressure turbine located upstream of the low pressure turbine rotor and at least one rotor of a high pressure compressor located upstream of the high pressure turbine, the low and high pressure spools being rotatable independently from one another, and at least one controller controlling a rotation of the low pressure spool throughout a range of a power demand on the gas turbine engine and controlling the high pressure spool to rotate at a rotational speed having an at least substantially constant temperature-corrected value throughout the range of the power demand on the gas turbine engine, the temperature-corrected value being determined based on the rotational speed of the high pressure spool and an air temperature measured outside of the gas turbine engine.

DESCRIPTION OF THE DRAWINGS

Reference is now made to the accompanying figures in which.

DETAILED DESCRIPTION

Figure 1:
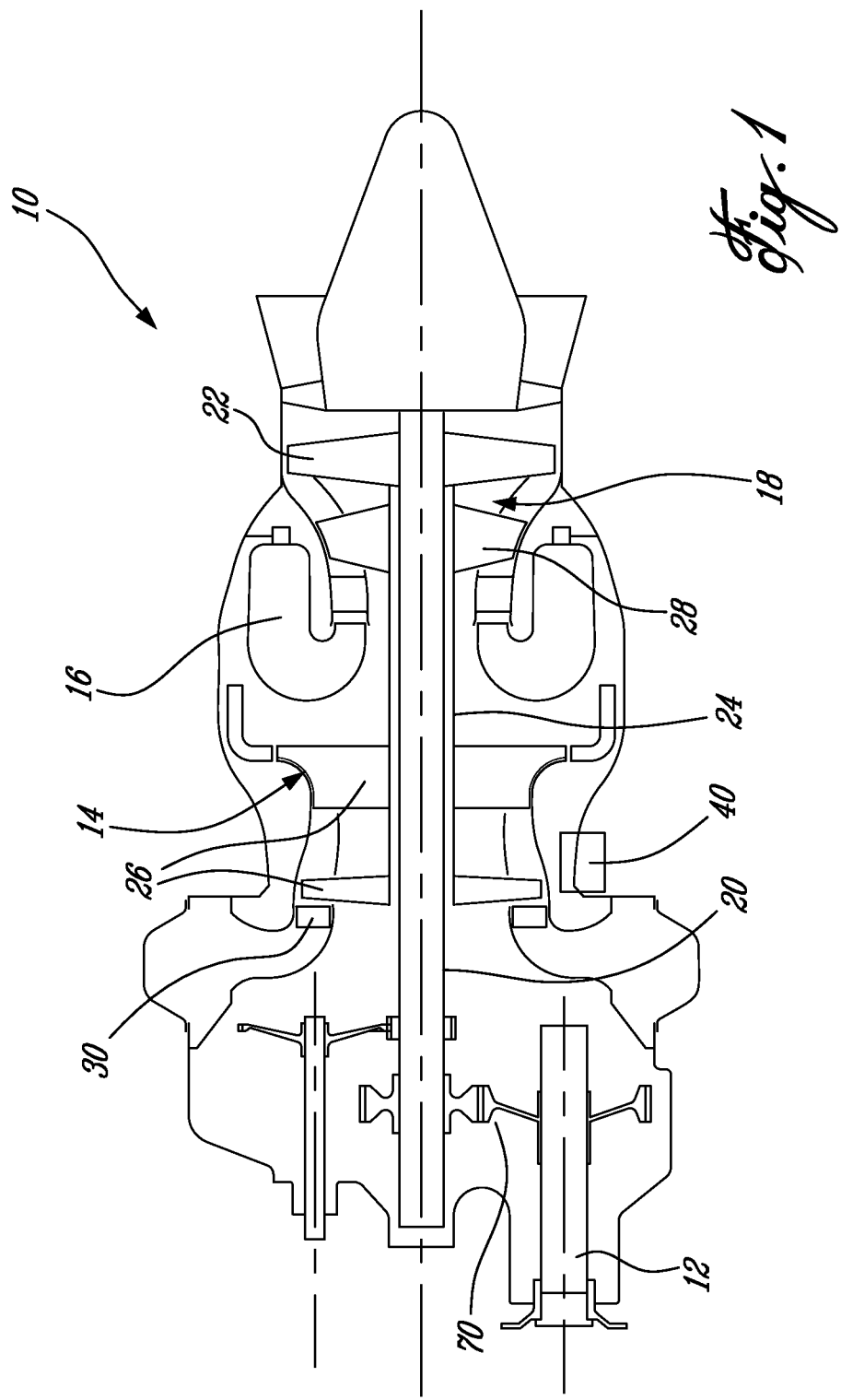
FIG. 1 is a schematic cross-sectional view of a gas turbine engine.

FIG. 1 illustrates a turbo shaft gas turbine engine 10 of a type preferably provided for use in subsonic flight, generally comprising in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

The engine 10 includes a low pressure/power turbine shaft or spool 20 supporting the rotor(s) 22 of the low pressure portion of the turbine section 18. The low pressure spool 20 also rotates, through a reduction gearbox 70, a propeller shaft 12 supporting a propeller (not shown).

The engine 10 also includes a high pressure/gas generator shaft or spool 24 supporting the rotor(s) 26 of a high pressure portion of the compressor section 14 and the rotor(s) 28 of a high pressure portion of the turbine section 18. The low pressure and high pressure spools 20, 24 are concentric and rotate independently from one another.

The engine 10 also includes variable inlet guide vanes 30 positioned upstream of the high pressure portion of the compressor section 14.

Figure 2:
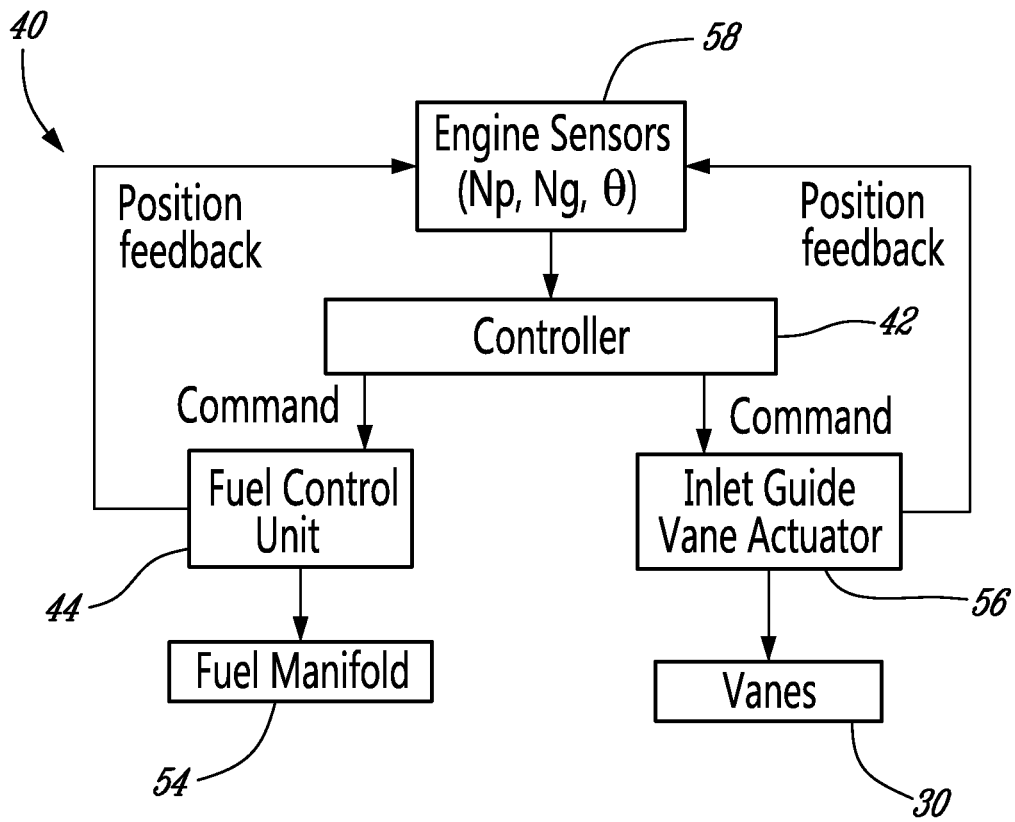
FIG. 2 is a schematic diagram of a control system used to control the rotational speed of spools of a gas turbine engine such as shown in FIG. 1.
Figure 3:
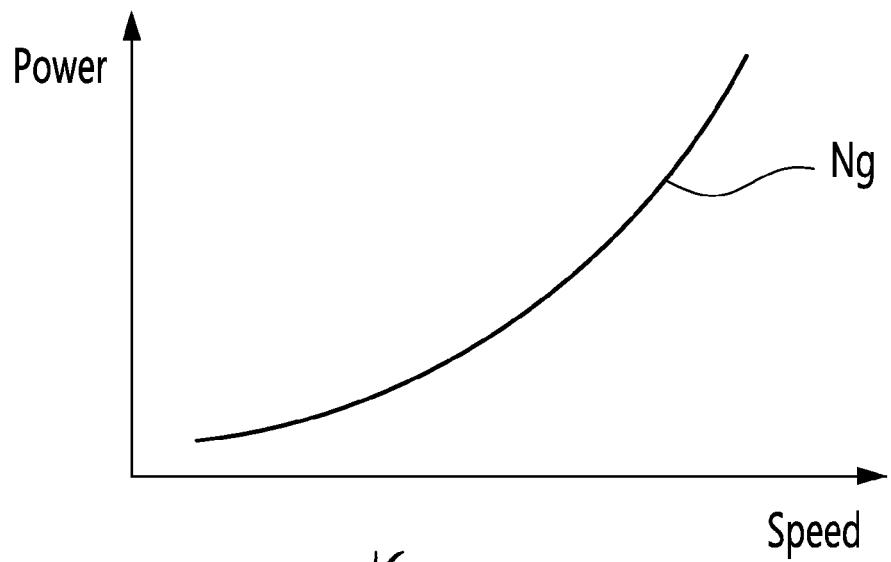
FIG. 3 illustrates a relationship between power demand and rotational speed for a high pressure spool of a gas turbine engine of the prior art.

Referring to FIG. 2, the engine 10 includes a control system 40 including at least one controller 42 which controls the rotational speed of the low and high pressure spools 20, 24. The controller 42 thus receives relevant data from engine sensors 58, including the rotational speed Np of the low pressure spool 20, the rotational speed Ng of the high pressure spool 24, and the temperature θ outside of the engine 10. In the embodiment shown, a single controller 42 controls both spools 20, 24, although alternately different controllers can be provided.

The controller 42 controls the rotational speed of the low pressure spool 20 by sending a command signal to a fuel control unit 44, which controls the flow of fuel through a manifold 54 delivering the fuel to the combustor. The controller 42 receives a feedback signal from the fuel control unit 44 indicative of the fuel flow through the manifold 54.

In a particular embodiment, the fuel control unit 44 includes a servo pressure regulator which provides fuel to a metering valve controller at a regulated pressure determined by the controller 42. The controller 42 controls the position of a metering valve through the metering valve controller.

The metering valve may include, for example, a piston moved by fuel pressure on each side, with the fuel pressure being provided by the metering valve controller as requested by the controller 42. The position of the metering valve determines the fuel flow provided to the fuel manifold(s) 54 of the gas turbine engine 10.

The controller 42 controls the rotational speed of the high pressure spool 24 by sending a command signal to an inlet guide vane actuator 56, which controls the orientation of the inlet guide vanes 30. The controller 42 receives a feedback signal from the inlet guide vane actuator 56 indicative of the orientation of the inlet guide vanes 30.

In a particular embodiment, the vane actuator 56 includes a piston moved by fuel pressure on each side, with the fuel pressure being provided by a vane controller as requested by the controller 42. The vane actuator 56 moves the variable inlet guide vanes 30, for example through rings (not shown) transferring the linear movement of the actuator 56 into a rotational movement for the vanes 30. An example of a connection between the actuator and the guide vanes is shown in U.S. Pat. No. 4,890,977 issued Jan. 2, 1990, which is incorporated herein by reference. It is to be understood that any adequate type of connection between the guide vanes 30 and the actuator 56 can alternately be used.

Thus, the controller 42 controls the rotational speed Np of the low pressure spool 20 through a modulation of the fuel flow, by acting on the fuel control unit 44. The controller also controls the rotational speed Ng of the high pressure spool 24 through a modulation of the angle of the variable inlet guide vanes 30, by acting on the vane actuator 56. The controller 42 thus controls the rotational speed of the two spools 20, 24 independently from one another.

It is understood that any other adequate type of control system can be provided, depending on the type of metering valve and guide vane actuator provided. For example, one or both of the metering valve and guide vane actuator may be electrically actuable instead of fuel-pressure operated, and the controller may thus controls them directly through an electrical signal.

The controller 42 controls the rotational speed Np of the low pressure spool 20 such that it remains at least substantially constant throughout a range of a power demand on the gas turbine engine 10, and preferably throughout the complete range of power demand, i.e. from 0 to a maximum power available. In the present application, "substantially constant" includes a variation within a range of approximately 5% of the nominal value.

The controller 42 controls the rotational speed Ng of the high pressure spool 24 according to a fixed relationship with respect to the outside air temperature θ and throughout the variation of power demand on the gas turbine engine 10.

Figure 4:
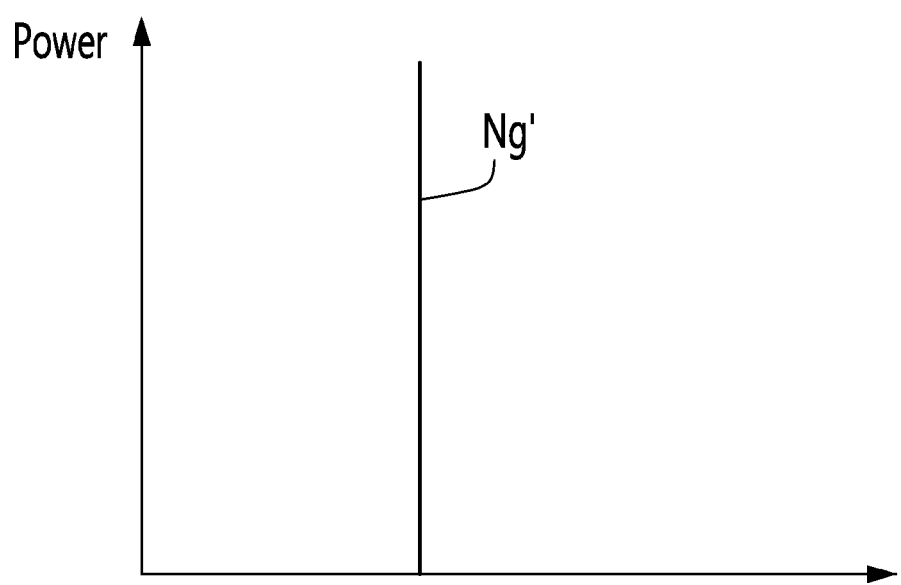
FIG. 4 illustrates a relationship between power demand and rotational speed for a high pressure spool of a gas turbine engine controlled through a control system such as shown in FIG. 2.

Referring to FIG. 4, in a particular embodiment, the controller 42 maintains a temperature-corrected rotational speed Ng' of the high pressure spool 24 at least substantially constant throughout the range of the power demand on the gas turbine engine 10, and preferably throughout the complete range of the power demand on the engine, i.e. from 0 to a maximum power available. The controller 42 determines the temperature-corrected rotational speed Ng' based on the actual rotational speed Ng of the high pressure spool 24 and on the outside air temperature θ as indicated by the appropriate sensor 58.

In a particular embodiment, the temperature-corrected rotational speed Ng' is defined as $Ng/\sqrt{\theta}$.

In use, when the power demand increases on the power turbine, the rotational speed Np of the low pressure spool 20 starts to decrease. In response, the controller 42 commands the fuel flow to increase through the fuel control unit 44 such as to bring the rotational speed Np of the low pressure spool 20 back to the desired constant value. However, as the fuel flow increases, the rotational speed Ng of the high pressure spool 24 and its temperature-corrected value Ng' start to increase. In response, the controller 42 commands the inlet guide vanes 30 to open through the inlet guide vane actuator 56 such as to reduce the rotational speed Ng of the high pressure spool 24 and bring its the temperature-corrected value Ng' back to the desired constant value while maintaining power.

Figure 5:
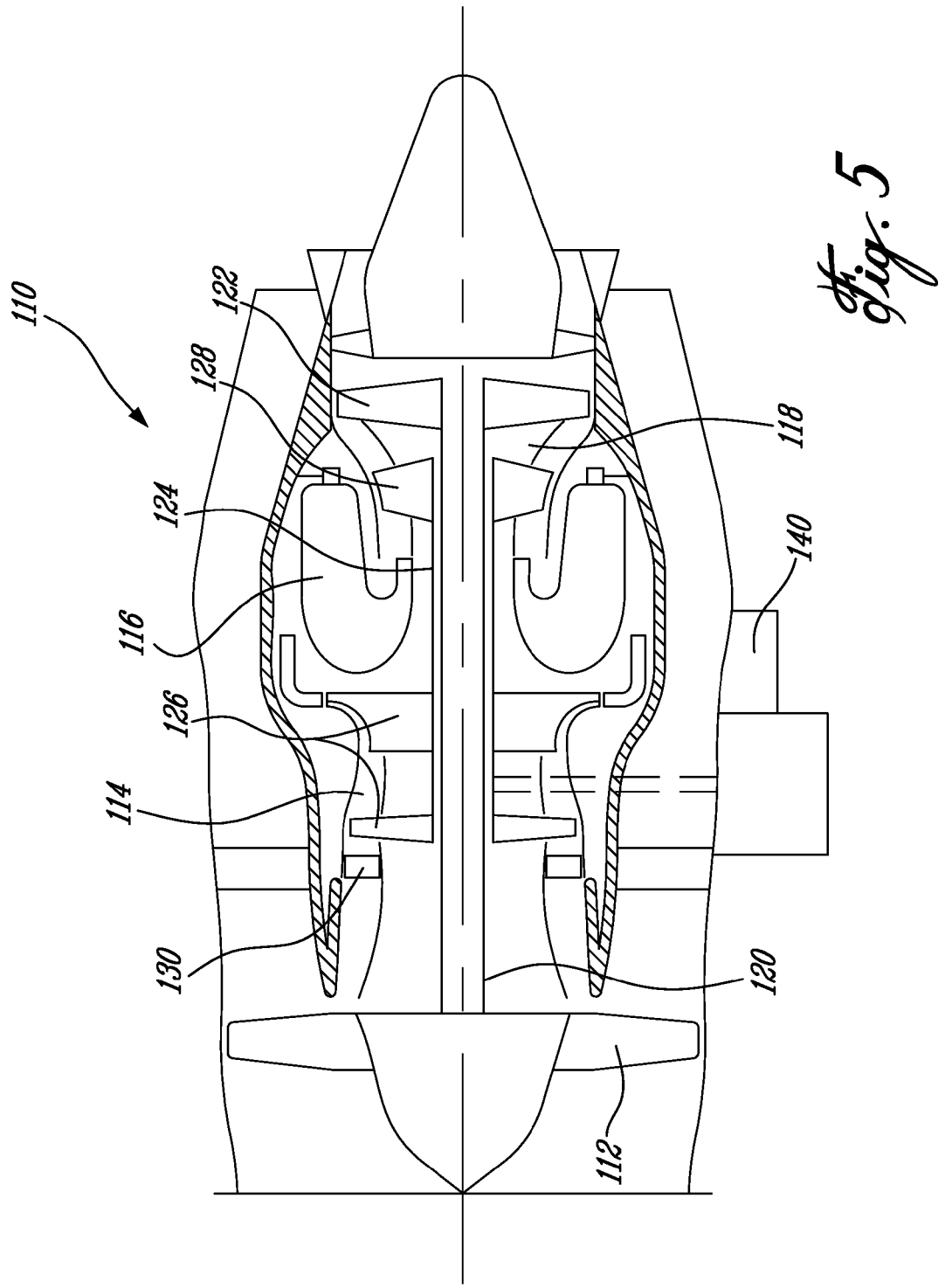
FIG. 5 is a schematic cross-sectional view of another type of gas turbine engine.

FIG. 5 illustrates another embodiment of a gas turbine engine 110. The turbofan engine 110 comprises in serial flow communication a fan 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The engine 110 includes a low pressure/power turbine shaft or spool 120 supporting the fan 112 and the rotor(s) 122 of the low pressure portion of the turbine section 118. The engine 110 also includes a high pressure/gas generator shaft or spool 124 supporting the rotor(s) 126 of a high pressure portion of the compressor section 114 and the rotor(s) 128 of a high pressure portion of the turbine section 118. The low pressure and high pressure spools 120, 124 are concentric and rotate independently from one another.

The engine 110 also includes variable inlet guide vanes 130 positioned upstream of the high pressure portion of the compressor section 114.

The engine 110 further includes a control system 140 which controls the rotational speed of the high and low pressure spools 120, 124. The control system 140 may be similar to the control system 40 of the previous embodiment, or may be any other adequate system for controlling the rotational speed of the high and low pressure spools 120, 124 as required.

As above, the control system 140 controls a rotational speed Ng of the high pressure spool 124 according to a fixed relationship with respect to the outside air temperature throughout the variation of output power. In a particular embodiment, the rotational speed Ng of the high pressure spool 124 is controlled such that a corrected value of the rotational speed Ng' of the high pressure spool 124, determined based on the outside air temperature θ, remains at least substantially constant throughout the variation of output power.

As above, in a particular embodiment, the corrected value of the rotational speed Ng' of the high pressure spool 124 is calculated as $Ng/\sqrt{\theta}$.

However in this embodiment, the rotational speed Np of the low pressure spool 120 varies with the variation of output power.

The above described control of the rotational speed of the high pressure spool 120, 124 may provide improvements in engine operability and result in rapid augmentation and reduction of delivered power, which may improve response times over a conventional two spool free turbine engine.

The above description is meant to be exemplary only, and one skilled in the art will recognize that changes may be made to the embodiments described without departing from the scope of the invention disclosed. For example, the described control method is not limited to the specific gas turbine engines shown and can be used in any type of free gas turbine engine including various configurations of APUs, turbofans, turboprops and turboshafts. Still other modifications which fall within the scope of the present invention will be apparent to those skilled in the art, in light of a review of this disclosure, and such modifications are intended to fall within the appended claims.

The invention claimed is:

1. A method of controlling a speed of a gas turbine engine, the gas turbine engine including a high pressure spool and a low pressure spool rotating independently from one another, the method comprising:
   determining a temperature-corrected rotational speed of the high pressure spool based on an actual rotational speed of the high pressure spool and on an air temperature measured outside of the gas turbine engine;
   controlling the rotation of the high pressure spool to maintain the temperature-corrected rotational speed of the high pressure spool at least substantially constant throughout a range of a power demand on the gas turbine engine by modulating an angle of variable inlet guide vanes throughout the range of the power demand, the variable inlet guide vanes being located upstream of a compressor having at least one rotor rotating with the high pressure spool; and
   controlling a rotational speed of the low pressure spool independently of the rotation of the high pressure spool.

2. The method as defined in claim 1, wherein the temperature-corrected rotational speed of the high pressure spool is calculated as $Ng/\sqrt{\theta}$, where $Ng$ is the actual rotational speed of the high pressure spool and $\theta$ is the air temperature measured outside of the gas turbine engine.

3. The method as defined in claim 1, further comprising maintaining the rotational speed of the low pressure spool at least substantially constant.

4. The method as defined in claim 3, wherein the rotational speed of the low pressure spool is maintained at least substantially constant by modulating a fuel flow of the gas turbine engine throughout the range of the power demand.

5. The method as defined in claim 1, wherein the temperature-corrected rotational speed of the high pressure spool is maintained at least substantially constant while the power demand varies from 0 to a maximum power available from the gas turbine engine.

6. A method of controlling a speed of a gas turbine engine throughout a range of a power demand thereon, the gas turbine engine including a gas generator spool and a power turbine spool rotating independently from one another, the method comprising:
   determining a temperature-corrected rotational speed of the gas generator spool based on an actual rotational speed of the gas generator spool and on an air temperature measured outside of the gas turbine engine;
   controlling the rotation of the gas generator spool to maintain the temperature-corrected rotational speed of the gas generator spool within 5% of a nominal desired value throughout the range of the power demand by modulating an angle of variable inlet guide vanes located upstream of a compressor having at least one rotor rotating with the gas generator spool; and
   controlling a rotational speed of the power turbine spool independently of the rotation of the gas generator spool;
   wherein the nominal desired value is constant throughout the range of the power demand.

7. The method as defined in claim 6, wherein the temperature-corrected rotational speed is calculated as $Ng/\sqrt{\theta}$, where $Ng$ is the actual rotational speed of the gas generator spool and $\theta$ is the air temperature.

8. The method as defined in claim 6, further comprising controlling the rotational speed of the power turbine spool to remain at least substantially constant throughout the range of the power demand.

9. The method as defined in claim 8, wherein the rotational speed of the power turbine spool is controlled by modulating a fuel flow of the gas turbine engine.

10. A gas turbine engine comprising:
    a low pressure spool supporting at least one rotor of a low pressure turbine;
    a high pressure spool supporting at least one rotor of a high pressure turbine located upstream of the low pressure turbine rotor and at least one rotor of a high pressure compressor located upstream of the high pressure turbine, the low and high pressure spools being rotatable independently from one another; and
    at least one controller configured to control a rotation of the low pressure spool throughout a range of a power demand on the gas turbine engine, determine a temperature-corrected rotational speed of the high pressure spool based on an actual rotational speed of the high pressure spool and on an air temperature measured outside of the gas turbine engine, control a rotation of the high pressure spool to maintain the temperature-corrected rotational speed at an at least substantially constant value throughout the range of the power demand on the gas turbine engine by modulating an angle of variable inlet guide vanes located upstream of the high pressure compressor throughout the range of the power demand, and control a rotation of the low pressure spool independently from the rotation of the high pressure spool.

11. The gas turbine engine as defined in claim 10, wherein the at least one controller is configured to determine the temperature-corrected rotational speed of the high pressure spool as $Ng/\sqrt{\theta}$, where $Ng$ is the actual rotational speed of the high pressure spool and $\theta$ is the air temperature measured outside of the gas turbine engine.

12. The gas turbine engine as defined in claim 10, wherein the at least one controller is configured to control the low pressure spool to rotate at an at least substantially constant speed throughout the range of the power demand on the gas turbine engine.

13. The gas turbine engine as defined in claim 12, wherein the at least one controller is configured to control rotational speed of the low pressure spool by modulating a fuel flow of the gas turbine engine throughout the range of the power demand.

14. The gas turbine engine as defined in claim 10, wherein the range of the power demand throughout which the at least one controller is configured to control the rotation of the high pressure spool to maintain the temperature-corrected rotational speed at the at least substantially constant value extends from zero to a maximum available power from the gas turbine engine.

* * * * *